Oct. 27, 1959   J. BLUE   2,909,866
DUSTER NOZZLE
Filed Sept. 20, 1956

INVENTOR:

John Blue,

BY Cushman, Darby & Cushman
ATTORNEYS.

United States Patent Office 2,909,866
Patented Oct. 27, 1959

2,909,866

DUSTER NOZZLE

John Blue, Huntsville, Ala., assignor to John Blue Company, Incorporated, Huntsville, Ala., a corporation of Alabama Application September 20, 1956, Serial No. 611,058

2 Claims. (Cl. 43—145)

The present invention relates to nozzles or outlet constructions for discharging fluid-conveyed materials, and, more specifically, to nozzle constructions particularly adapted to be used for applying granular or powdered materials such as insecticides, to growing crops or plants and the like.

In the application of granular insecticides and the like to certain crops, such as corn, by means of conventional dusting nozzle constructions, the insecticide and the motive fluid therefor are usually delivered to the nozzle at relatively high pressures and velocities and discharged from the nozzle directly onto the crops at these high velocities. This high velocity of application causes a considerable amount of the insecticide to be blown off the leaves of the crops being treated. It is highly desirable, therefore, that the nozzle construction reduce the velocity of the stream of granular material flowing therethrough and discharge it onto the crops at relatively low velocities and in smooth, even-flowing streams so that the individual granular particles of the insecticide will not be blown off the crops.

Numerous attempts have been made to design dusting nozzles which would desirably reduce the velocity of the discharging stream by arranging deflectors or other obstructions in the path of the discharging stream. These devices have not been satisfactory, however, inasmuch as the conventional types of deflectors cause swirling or turbulence in the discharging stream which impairs the efficiency of the dusting operation.

Accordingly, it is an important object of this invention to provide a novel nozzle construction particularly adapted to apply granular insecticides or the like to crops and other vegetation in low velocity, smoothly flowing streams.

A further object is to provide a dusting nozzle having a novel deflector associated therewith which not only reduces the velocity of the fluid stream in the nozzle but also effects a discharge or delivery of the granular materials in streams flowing smoothly with a minimum of turbulence whereby the insecticide will be gently deposited on the leaves of the crops being treated.

Another object is to design a simplified and inexpensive dusting nozzle construction for applying insecticides efficiently economically by effecting a substantially constant and even distribution of insecticide in the discharging stream.

Further objects will be in part obvious and in part pointed out hereinafter.

The invention and the novel features thereof may best be made clear from the following description, and the accompanying drawing, in which.

Figure 1:
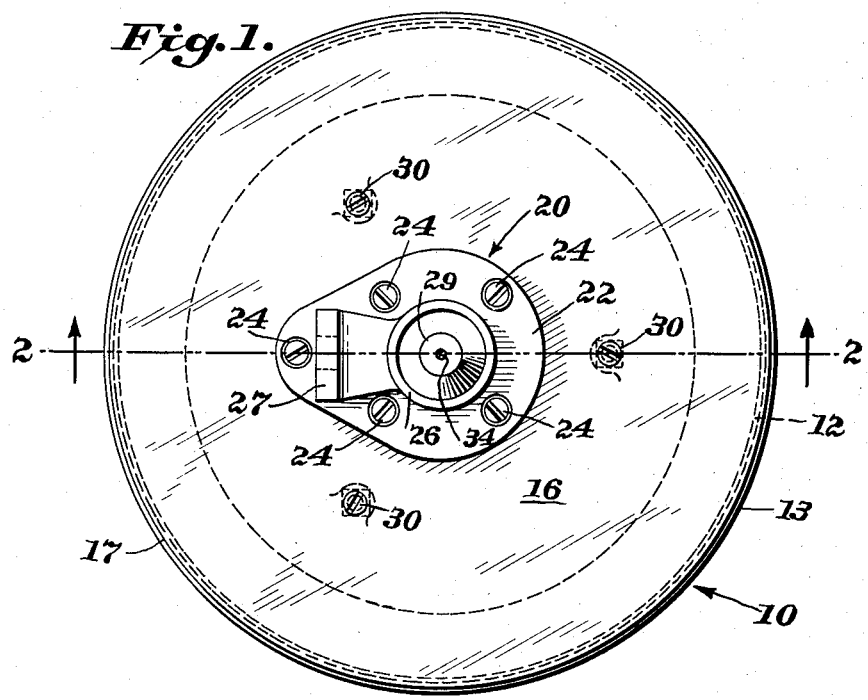
Figure 1 is a top plan view of a nozzle construction embodying this invention.
Figure 2:
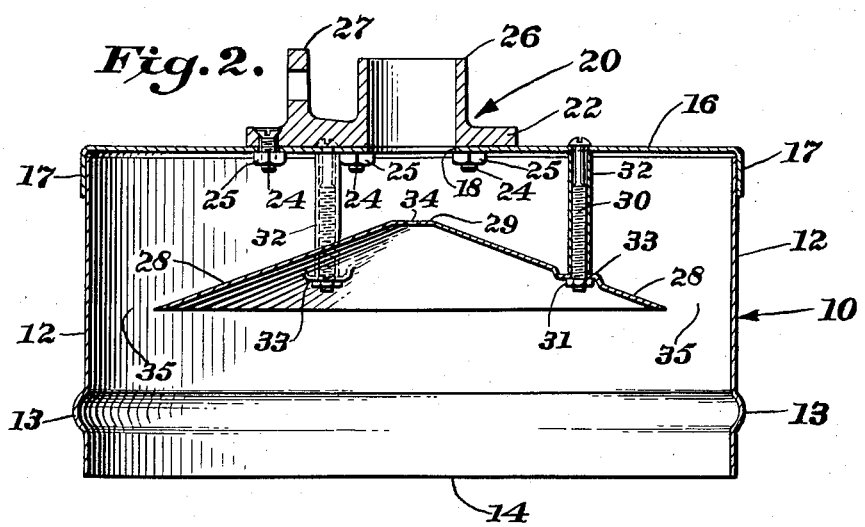
Figure 2 is a vertical sectional view of the nozzle taken along line 2—2 of Figure 1.

Referring to the drawings in detail, the duster nozzle construction 10, as best seen in Figure 2, preferably includes a cylindrical, tubular member or housing 12, provided with an annular stiffening rib or bulge 13 or the like. Nozzle 10 is open at one end to define an outlet 14 and has a circular web portion or end wall 16 closing the other end thereof. The web portion 16 may be provided with a peripheral, depending flange 17 embracing and suitably secured to the adjacent end of the tubular member 12, as shown. A centrally disposed circular opening 18 is formed in the web 16 and defines an inlet for the nozzle coaxial with the member 12.

Disposed on the outer surface of the web portion 16 is a suitable coupling means 20 whereby the nozzle may be conveniently attached to a conduit, such as the usual hose (not shown), for conveying dust to the nozzle. The coupling member 20 may include a flat, generally oval flange portion 22, conveniently secured to the web as by bolts 24 and nuts 25 and may also include an upstanding cylindrical boss 26 coaxial with inlet 18 and for engagement with a hose. As is well understood, the outer diameter of the boss 26 will be selected in accordance with the size of the conduit to be attached thereto. An apertured upstanding lug 27 may be arranged on the base 22 for facilitating the attachment of the nozzle to conduits or other structures. The inner diameter of the boss 26 preferably is the same as the diameter of the inlet opening 18 so that the interior of the boss may be arranged flush with the inlet to prevent turbulence in this region.

In a preferred form of the invention, a generally conical deflector or baffle 28 of large included angle and having a planar apex portion 29 is arranged within the tubular member 12, coaxially therewith and in the path of the stream of material flowing through the inlet 18. The deflector 28 preferably is suspended in the member 12 intermediate the inlet and outlet thereof, by means of bolts 30 and nuts 31 extending between the web portion 16 and the deflector 28 and cooperating with cylindrical spacer sleeves 32, with the convex surface of the deflector facing the nozzle inlet 18 and the concave surface facing the outlet 14. To facilitate this mounting of the deflector, the latter may be provided with an appropriate number of angularly spaced, depressed, planar areas 33 corresponding to the number of bolts used, there being three of these shown for illustrative purposes.

The outer periphery of the deflector 28 cooperates with the inner surface of member 12 to define an annular opening or passageway 35 in the member 12 intermediate the nozzle inlet and outlet. It will be noted that the annular passageway 35 is continuous, uninterrupted and unobstructed. Preferably, the deflector is of such size that it will obstruct more than one-half (50%) and desirably approximately 60% of the cross-sectional area of the nozzle member 12, while the annular passageway 35 will be of much greater cross-sectional area than the nozzle inlet 18. Additionally, deflector 28 is arranged upstream of outlet 14 so that the material flowing therepast will expand in the member 12 before discharging therefrom.

In the application of granular insecticides by the nozzle 10 of the present invention, the granular material is conveyed by its carrier air through nozzle inlet 18 and strikes the convex surface of the deflector 28 to be deflected or diverted thereby generally radially outwardly in the direction of the tubular member 12 for subsequent flow through the annular passageway 35. By reason of the cross-sectional area of passageway 35 being larger than that of inlet 18 and the loss of energy in striking deflector 28, the stream of material flowing through passageway 35 will be travelling at a considerably smaller velocity than it does at inlet 18. In addition, the space between the convex surface of the deflector and the web 16 will permit a certain amount of expansion of the stream of material in this region further reducing the velocity of movement thereof.

As the granular material flows downstream from the deflector 28, it will expand radially inwardly from the side walls of the tubular member 12 to effectuate a still further reduction in the velocity of movement thereof, while also increasing the area comprehended by the discharging stream. In this connection, it will be obvious that the axial position of the deflector 28 within the tubular member 12 may be adjusted to be closer to, or farther away from, the outlet 14, or the height of the tubular member 12 varied for providing a greater or smaller expansion chamber downstream of the deflector.

Thus, it will be seen that with a given pressure of motive fluid or the like for conveying the granular material to the nozzle 10, the velocity of the stream will be greatly reduced as it passes through the nozzle, and the discharging stream will be continuous and somewhat annular since there are no physical obstructions in the annular passageway 35. In this manner the granular material will tend to be constantly distributed evenly and uniformly throughout the discharging annular stream for a uniform flow from the nozzle 10.

It has been found in practice that the stream of material flowing past the deflector 28 tends to cause a reduced pressure at the concave side thereof, i.e., the region extending from the deflector concave surface to the outlet 14. As will be readily understood, this reduced pressure zone, or partial vacuum, causes disturbances or turbulence in the stream as it flows through the nozzle. Such disturbances are undesirable in that they cause the granular material to swirl or be drawn inwardly and upwardly away from the main flow stream, thereby producing an undesirable and irregular flow and also an irregular distribution of granular material in the discharge. Furthermore, this swirling effect produces localized velocity increases which are responsible, to some extent, for causing a portion of the granules or dust to be blown off the leaves.

I have devised an effective and inexpensive structure to resist or prevent the creation of this undesirable reduced pressure and its consequences. A preferred form of this structure, which constitutes an important feature of the invention, comprises the provision of a small aperture or opening 34 in the apex 29 of the deflector 28. In the operation of the nozzle 10 having such a deflector aperture 34, a portion of the motive fluid for the granular material will be induced to flow or be sucked through the aperture 34 into the space comprehended by the concave side of the deflector and thus prevent the creation of a reduced pressure in this space, whereby the discharging stream will flow smoothly with a substantially uniform and even distribution of material therein. A small amount of granular material may flow through the aperture 34 depending upon the size thereof; however, this amount will be negligible under most circumstances due to the small cross-sectional area of aperture 34.

Thus, the present nozzle construction will not only significantly reduce the velocity of the stream of granular insecticides or the like flowing therethrough to a desirably low magnitude, but will also be effective to discharge such insecticides in smoothly flowing streams having a substantially uniform distribution of material therein. Consequently, in the application of granular insecticides to the leaves of corn and the like, by the nozzle 10 of the invention, the insecticide will strike the leaves substantially as softly as gently falling rain drops. In this manner, the insecticide will tend to remain on the leaves to which it is applied, rolling to desirable points, such as the junctions between the leaves and the stalk or stem. Moreover, it will be understood that the insecticides may readily be distributed in substantially equal and even proportions throughout the entire area being treated, inasmuch as the insecticide is distributed substantially uniformly in the stream which discharges at a substantially constant rate for constant rates of inlet flow to the nozzle.

The nozzle construction may be of such size that it can be mounted on a moving structure to discharge relatively large streams of insecticide or it may be adapted to be manipulated in the hand of the operator, and in either case the nozzle is preferably arranged to discharge vertically downwardly although other positions of use may be utilized effectively.

The configuration of the tubular member 12 and web portion 16 may be modified within the scope of the invention; for example, the web portion may be of generally frusto-conical or conical shape tapering inwardly and upwardly from the flange 17 to inlet 18, or the tubular member 12 may be of polygonal or other cross-sectional shape. If the end wall is tapered, as stated above, the included or apex angle preferably will be as large or larger than the included angle of deflector 28, so that a desirable expansion of the flowing stream will occur between the end wall and the deflector. Additionally, the apex angle of deflector 28 may be varied from that shown and still effect desirable results.

It will thus be seen that there has been provided, by this invention, a novel nozzle construction in which the various objects hereinabove set forth, together with many practical advantages, are successfully achieved. As various possible embodiments may be made of the mechanical features of the invention, such as those previously mentioned, all without departing from the scope thereof, it is to be understood that all matter hereinbefore set forth or shown in the accompanying drawing is to be interpreted as illustrative and not in a limiting sense.

I claim:

1. A duster nozzle for discharging granular material suspended in a motive fluid, said nozzle comprising an upright, cylindrical body portion open at the lower end thereof to define an outlet, said nozzle also having an upper wall portion joined to said body portion and provided with a centrally disposed opening defining an inlet coaxial with and smaller than said outlet; a frusto-conical deflector, means for suspending said deflector solely from said upper wall portion in said nozzle intermediate said inlet and said outlet and coaxial therewith, the concave side of said deflector facing said outlet, said deflector being substantially imperforate and obstructing at least one-half of the cross-sectional area of said body portion and cooperating therewith to define a continuous and uninterrupted annular passageway of greater cross-sectional area than said inlet for producing a smooth and continuous annular stream of substantially all of the granular material flowing from said inlet, said deflector having a free end positioned upstream from said outlet a sufficient distance so that the annular stream will expand radially inwardly before discharging from said nozzle; and there being a relatively small aperture in the apex of the deflector permitting a relatively small portion of the motive fluid from the inlet to flow axially through said deflector whereby to prevent turbulence in the annular stream as it passes said deflector.

2. The structure defined in claim 1 wherein said means for suspending said deflector solely from said upper wall portion comprises a plurality of cylindrical spacer sleeves engaged at opposite ends respectively to said upper wall portion and to said deflector, a bolt extending through each of said sleeves and also through said wall portion and said deflector and a nut engaged to each bolt for retaining said deflector in stationary position in engagement with said sleeves.

References Cited in the file of this patent

UNITED STATES PATENTS

| | | |
|---|---|---|
| 511,781 | Leggett | Jan. 2, 1894 |
| 1,602,845 | Burborn | Oct. 12, 1926 |
| 2,641,476 | Keleher | June 9, 1953 |

FOREIGN PATENTS

| | | |
|---|---|---|
| 137,458 | Switzerland | Mar. 17, 1930 |